United States Patent [19]

Nelander

[11] Patent Number: 5,626,210
[45] Date of Patent: May 6, 1997

[54] CONTROL ARM ARRANGEMENT FOR A BRAKE LEVER

[75] Inventor: Ake Nelander, Bunkeflostrand, Sweden

[73] Assignee: Haldex AB, Sweden

[21] Appl. No.: 256,307

[22] PCT Filed: Mar. 2, 1993

[86] PCT No.: PCT/SE93/00081
  § 371 Date: Aug. 22, 1995
  § 102(e) Date: Aug. 22, 1995

[87] PCT Pub. No.: WO93/16429
  PCT Pub. Date: Aug. 19, 1993

[51] Int. Cl.⁶ .................. G05G 23/00; F16D 65/14
[52] U.S. Cl. .................. 188/79.55; 403/363; 74/519
[58] Field of Search .................. 403/393, 387, 403/363, 79, 66, 119, 24; 74/519; 192/99 S; 188/79.55, 196 BA

[56] References Cited

U.S. PATENT DOCUMENTS

| | | | |
|---|---|---|---|
| 3,437,047 | 4/1969 | Foltz | 430/363 X |
| 4,015,692 | 4/1977 | Mathews | 188/79.55 |
| 4,440,268 | 4/1984 | Karlsson | 192/111 A X |
| 4,583,622 | 4/1986 | Ebbinghaus et al. | 74/128 X |
| 4,949,591 | 8/1990 | Roelle | 74/519 X |
| 5,073,060 | 12/1991 | Pethers | 403/363 X |
| 5,327,999 | 7/1994 | Nelander | 188/79.55 |
| 5,477,945 | 12/1995 | Klass et al. | 188/79.55 X |

FOREIGN PATENT DOCUMENTS 1538848  1/1979  United Kingdom ............... 188/79.55

Primary Examiner—Harry C. Kim
Attorney, Agent, or Firm—Laurence R. Brown

[57] ABSTRACT

A control arm arrangement for a road vehicle brake lever (1) comprises a control arm (3) pivotally connected to the brake lever and an anchor bracket (4) for attachment to an underframe part (2) of the vehicle. Facing ends of the control arm and the anchor bracket are provided with flanges (10, 11), so that the closely cooperating ends are U-shaped in cross-section.

1 Claim, 2 Drawing Sheets

CONTROL ARM ARRANGEMENT FOR A BRAKE LEVER

TECHNICAL FIELD

This invention relates to a control arm arrangement for a road vehicle brake lever, comprising a control arm pivotally connected to the brake lever and an anchor bracket for attachment to an underframe part of the vehicle.

BACKGROUND OF THE INVENTION

A conventional brake lever for a heavy road vehicle is mounted on an S-cam shaft of a drum brake and is connected to a brake cylinder, as is well known in the art. It contains an automatic slack adjuster, which for its function needs a control signal, provided by a control arm connected to a fix-point on the vehicle, normally by means of an anchor bracket.

Conventionally, the control arm and the anchor bracket are connected by means of a screw-Joint, containing a washer and possibly a wear-reducing plastic insert. At mounting the corresponding holes in the two parts have to be aligned and the screw-joint (screw and nut) securely fastened. Due to vibrations and mutual movements it is difficult to obviate wear and noise. The screw-joint may also give difficulties at later dismounting.

Another possibility is to provide the anchor bracket with a slot for cooperation with a suitably shaped end of the control arm. The cooperating contact surfaces are small, which means that the problem with wear is not obviated, even if the mounting difficulties are decreased.

The Invention

A far better solution is according to the invention attained in that facing ends of the control arm and the anchor bracket are provided with flanges, so that the closely cooperating ends are U-shaped in cross-section.

The arrangement is extremely easy to mount and dismount, there are no connection means and the contact area between the cooperating parts is very large, which means that the wear will be minimal, even if the arrangement is subjected to vibrations and big forces.

BRIEF DESCRIPTION OF THE DRAWINGS

The invention will be described in further detail below reference being made to the accompanying drawing, in which.

DETAILED DESCRIPTION OF A PREFERRED EMBODIMENT

A conventional brake lever containing an automatic slack adjuster has the numeral 1. As is well known in the art and accordingly not shown, such a lever is mounted on an S-cam shaft for a drum brake of a heavy road vehicle and is connected to a brake cylinder push rod.

Figure 1:
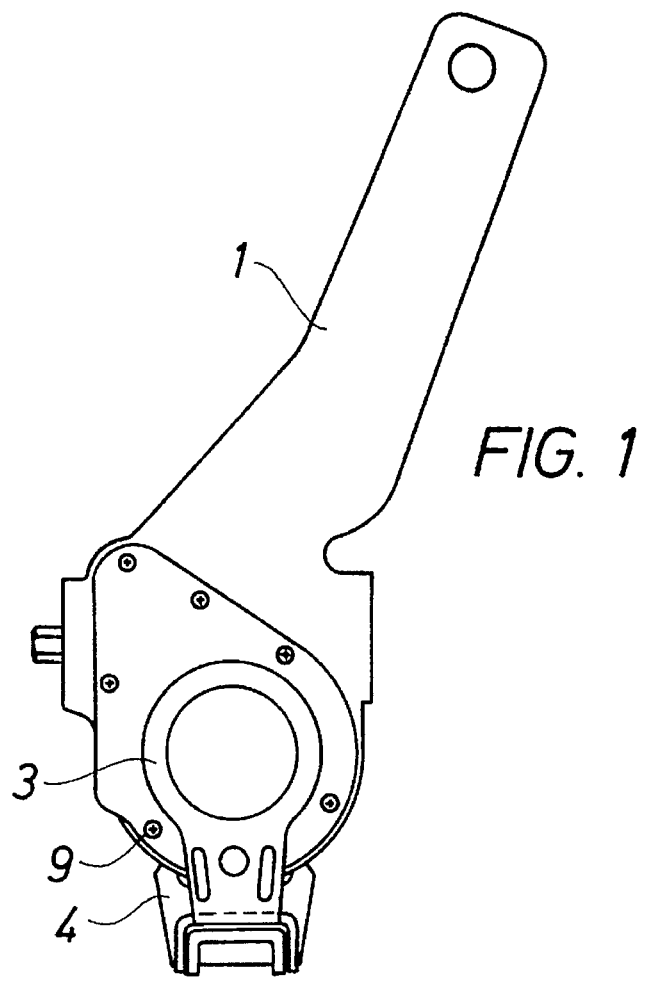
FIG. 1 is a side view of a road vehicle automatic brake lever with a control arm arrangement according to the invention.
Figure 3:
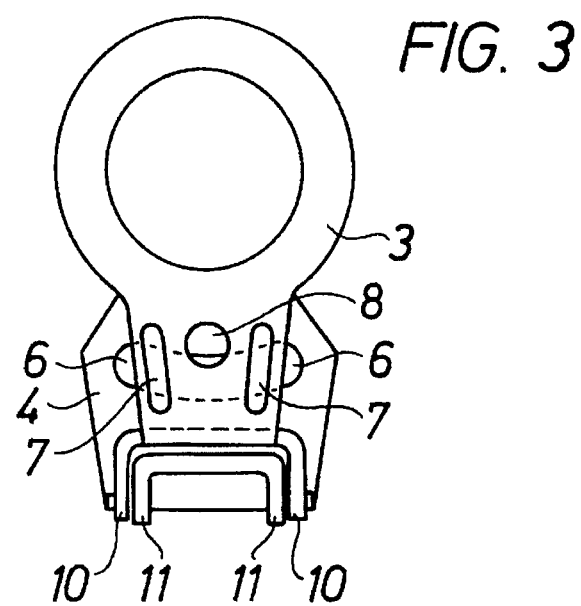
Figure 2:
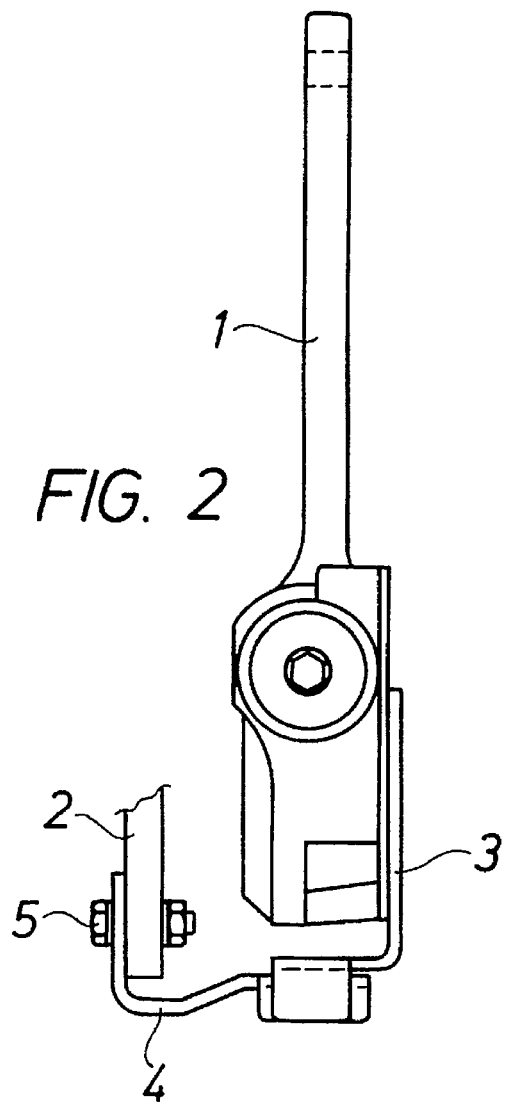
FIG. 2 is an end view of the same arrangement, whereas FIGS. 3 and 4 to a larger scale and in views corresponding to those according to FIGS. 1 and 2, respectively, show the two parts relevant to the invention.
Figure 4:
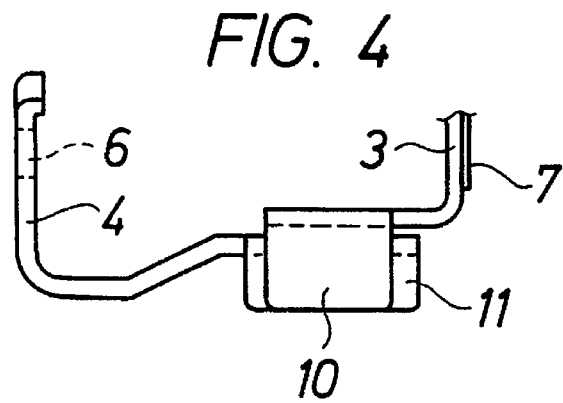

A brake lever 1 of this kind, which in operation is rocking about its shaft at each brake application and release, needs a fixed reference point for its internal slack adjusting mechanism. This reference point may, as shown in FIG. 2, be an underframe part 2, which is also used for journaling the S-cam brake shaft (not shown).

The arrangement for connecting the brake lever 1 with the underframe part 2 consists of two details, namely a control arm 3 and an anchor bracket 4. The control arm 3 is pivotally connected to the brake lever 1 in order to transmit a control signal to internal parts thereof, whereas the anchor bracket 4 is connected to the underframe part 2 by means of at least one screw-joint 5 in an oblong hole 6 in the anchor bracket 4 so as to allow position adjustments.

The control arm 3 may be provided with stiffening ribs 7 in the plate material and a hole 8 for access to screws 9, which would otherwise be covered. The lower part of the control arm 3 is bent at a right angle and is there provided with flanges 10 so as to have a U-shape in cross-section.

In a corresponding way the end of the anchor bracket 4 is bent and is provided with flanges 11 so as also to have a U-shape in cross-section. The dimensioning is such that relative axial movements between the two U-shaped ends are possible but that they fit together rather closely sideways. In this way a very large contact area between the two cooperating parts is obtained with a resulting minimal wear. The arrangement is easy to install, and there are no holes, screws, nuts, washers or inserts as in the arrangement it is to replace.

I claim:

1. In a control arm arrangement for a road vehicle brake lever having a control arm pivotably connected to the brake lever and an anchor bracket connected to an underframe part of a vehicle to establish a fixed reference point on the vehicle, wherein the improvement comprises:

a control arm configuration with two facing ends of a first flange having an U-shaped cross section and two facing ends of an anchor bracket second flange having an U-shaped cross section for fitting closely with the first flange facing ends to produce a contact area between the first and second flanges, thereby to withstand vibrations and forces between the vehicle and the brake lever with minimal wear.

* * * * *